United States Patent
Ramraz et al.

(10) Patent No.: US 10,877,871 B2
(45) Date of Patent: *Dec. 29, 2020

(54) REPRODUCTION OF TESTING SCENARIOS IN A CONTINUOUS INTEGRATION ENVIRONMENT

(71) Applicant: Red Hat Israel, Ltd., Ra'anana (IL)

(72) Inventors: Oded Ramraz, Westford, MA (US); Boaz Shuster, Ra'anana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/557,629

(22) Filed: Aug. 30, 2019

(65) Prior Publication Data
US 2019/0384694 A1    Dec. 19, 2019

Related U.S. Application Data

(63) Continuation of application No. 15/920,143, filed on Mar. 13, 2018, now Pat. No. 10,402,302.

(51) Int. Cl.
*G06F 11/36*    (2006.01)

(52) U.S. Cl.
CPC ........ *G06F 11/3612* (2013.01); *G06F 11/366* (2013.01); *G06F 11/368* (2013.01); *G06F 11/3672* (2013.01); *G06F 11/3684* (2013.01)

(58) Field of Classification Search
None
See application file for complete search history.

(56) References Cited

U.S. PATENT DOCUMENTS

| | | | |
|---|---|---|---|
| 8,112,392 B1 * | 2/2012 | Bunnell | G06F 16/188 707/625 |
| 9,652,326 B1 | 5/2017 | Bauer | |

(Continued)

FOREIGN PATENT DOCUMENTS

| | | |
|---|---|---|
| CN | 103577907 A | 12/2016 |
| CN | 106528200 A | 3/2017 |
| CN | 106909386 A | 6/2017 |

OTHER PUBLICATIONS

Aikateri Koukiou, Live LXC transport study and Implementation Save / Restore for LXC to LIBVIRT with the CRIU tool (Machine Translated), Oct. 2016. National Technical University of Athens, School of Electrical Engineering and Computer Engineering Computer and Information Technology. http://artemis-new.cslab.ece.ntua.gr:8080/jspui/bitstream/123456789/8010/1/DT2016-0321.pdf.

(Continued)

*Primary Examiner* — Qing Chen
(74) *Attorney, Agent, or Firm* — Haynes and Boone, LLP (57) ABSTRACT

An example method of reproducing a test case in a continuous integration environment includes detecting a test failure in a continuous integration environment. The continuous integration environment includes a plurality of stages for running a test on an application. The method also includes in response to detecting the failure, generating a snapshot while the test is running. The snapshot specifies a stage of the plurality of stages and a state of the application at which the failure occurred. The method further includes uploading the snapshot to a repository. At a later point in time, the snapshot may be restored to a computing device.

20 Claims, 6 Drawing Sheets

(56) References Cited

U.S. PATENT DOCUMENTS

| | | |
|---|---|---|
| 2006/0053139 A1 | 3/2006 | Marzinski |
| 2008/0034176 A1* | 2/2008 | Akutsu ............... G06F 11/2058 711/162 |
| 2015/0324260 A1 | 11/2015 | Mutalik |
| 2017/0337208 A1 | 11/2017 | Shuster |
| 2017/0344462 A1 | 11/2017 | Vecera |

OTHER PUBLICATIONS

Overview of Linux VMs in Azurein Azure. 2015, https://docs.microsoft.com/en-in/azure/opbuildpdf/virtual-machines/linux/toc.pdf?branch=live.

Anthony Baire, Docker Tutoria, Jan. 22, 2018, University of Rennes, http://people.irisa.fr/Anthony.Baire/docker-tutorial.pdf.

How to Configure a Continuous Integration Testing Environment with Docker and Docker Compose on Ubuntu 14.04. Nov. 3, 2016. https://www.dign.com/community/tutorials/how-to-configure-a-continuous-integration-testing-environment-with-docker-and-docker-compose-on-ubuntu-14-04. https://www.digitalocean.com/community/tutorials/how-to-configure-a-continuous-integration-testing-environment-with-docker-and-docker-compose-on-ubuntu-14-04.

* cited by examiner

File 208 import Library

Pipeline{
    agent {
    docker {
    image Library.Agent.Image.ContainerListener
    }
    }
    stage ("Build project") {
Library.Snapshot.On (image = "image1", exitCode =1,
        command=["git clone https://github.com/repo/
        project", "make project", "ARTIFACT_URL=
        'https://eng.thisProject.com' make upload"])
}
    stage ("Run unit-tests") {
Library.Snapshot.On (image = "image1", textContains = "FAIL:",
        command=["git clone https://github.com/repo/
        project", "make unit-test"])
}
    stage ("Run integration-tests") {
Library.IntegrateWith ("mongodb", "nginx").On(image="thisbox",
        textContains = "FAIL", exitCode =1, command=["git
        clone https://github.com/repo/project", "cd project",
        "make integration"])
Library.Integrator.TearDown()
    }
}

REPRODUCTION OF TESTING SCENARIOS IN A CONTINUOUS INTEGRATION ENVIRONMENT

CROSS REFERENCE TO RELATED APPLICATIONS

This application is a continuation of U.S. patent application Ser. No. 15/920,143 (now U.S. Pat. No. 10,402,302) filed Mar. 13, 2018, entitled "Reproduction of Testing Scenarios in a Continuous Integration Environment", which is incorporated by reference in its entirety herein.

BACKGROUND

The present disclosure generally relates to computing devices, and more particularly to reproduction of testing scenarios in a continuous integration environment.

Platforms exist for developing, shipping, and running applications. For example, a platform may allow developers to separate their applications from the infrastructure and treat the infrastructure like a managed application. The platform may help a developer ship software code faster, test faster, deploy faster, and shorten the cycle between writing and running the code. Additionally, the platform may combine kernel containerization features with workflows and tooling that help the developer manage and deploy applications.

Continuous Integration (CI) is a development practice that assists in producing applications ready for deployment. During the life cycle of a project, application developers may integrate small pieces of software into a project. As the project grows, different application developers may work on different aspects of the application.

BRIEF SUMMARY

Methods, systems, and techniques for reproducing a test case in a continuous integration environment are provided.

An example method of reproducing a test case in a continuous integration environment includes detecting a test failure in a continuous integration environment. The continuous integration environment includes a plurality of stages for running a test on an application. The method also includes in response to detecting the failure, generating a snapshot while the test is running. The snapshot specifies a stage of the plurality of stages and a state of the application at which the failure occurred. The method further includes uploading the snapshot to a repository. The method also includes restoring the snapshot.

An example system for reproducing a test case in a continuous integration environment includes a monitor that detects a test failure in a continuous integration environment. The continuous integration environment includes a plurality of stages for running a test on an application. The system also includes a snapshot module that in response to the monitor detecting the failure, generates a snapshot while the test is running. The snapshot specifies a stage of the plurality of stages and a state of the application at which the failure occurred. The snapshot module uploads the snapshot to a repository and restores the snapshot to a computing device.

An example machine-readable medium includes a plurality of machine-readable instructions that when executed by one or more processors are adapted to cause the one or more processors to perform a method including: detecting a test failure in a continuous integration environment, the continuous integration environment including a plurality of stages for running a test on an application; in response to detecting the failure, generating a snapshot while the test is running, the snapshot specifying a stage of the plurality of stages and a state of the application at which the failure occurred; uploading the snapshot to a repository; and restoring the snapshot to a computing device.

BRIEF DESCRIPTION OF THE DRAWINGS

The accompanying drawings, which form a part of the specification, illustrate examples and together with the description, further serve to explain the principles of the disclosure. In the drawings, like reference numbers may indicate identical or functionally similar elements. The drawing in which an element first appears is generally indicated by the left-most digit in the corresponding reference number.

DETAILED DESCRIPTION

It is to be understood that the following disclosure provides many different examples for implementing different features of the present disclosure. Some examples may be practiced without some or all of these specific details. Specific examples of components, modules, and arrangements may be described below to simplify the present disclosure. These are, of course, merely examples and are not intended to be limiting. Additionally, one or more of the examples disclosed below may be combined together.

Continuous integration is a development practice that assists in producing applications ready for deployment. During the life cycle of a project, application developers may integrate small pieces of software into a project. As the project grows, different application developers may work on different aspects of the application. A continuous integration environment may include a pipeline having a plurality of stages. In an example, the plurality of stages includes a build stage, a unit testing stage, and an integration testing stage. A test may help a user detect errors in the code and run at each stage of the plurality of stages. An error may also be referred to as a bug. After a test is run, the environment is typically cleaned as part of a cleanup stage. Accordingly, relevant resources (e.g., a physical host, virtual machines, containers, and storage space) are freed.

A problem may arise when a new error occurs and the environment has already been cleaned. For example, it may be difficult to debug the code because the environment in which the test was running and its associated data has been wiped out. Additionally, log files may not be detailed enough and may be missing crucial information regarding the system state.

A solution to this problem of debugging the code without sufficient information may include stopping the test when a new error occurs. Doing so, however, may disrupt the continuous integration flow. The present disclosure provides techniques to save the system state when a new bug occurs, and to clean the continuous integration environment and reproduce the issue later when desired. For example, a test failure may be detected and the relevant points snapshotted, without blocking the continuous flow of the test.

The present disclosure provides techniques for reproducing a test case in a continuous integration environment. Unless specifically stated otherwise, as apparent from the following discussion, it is appreciated that throughout the description, discussions utilizing terms such as "determining," "storing," "applying," "receiving," "sending," "detecting," "executing," "identifying," "generating," "providing," "analyzing," "uploading," "restoring," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Figure 1:
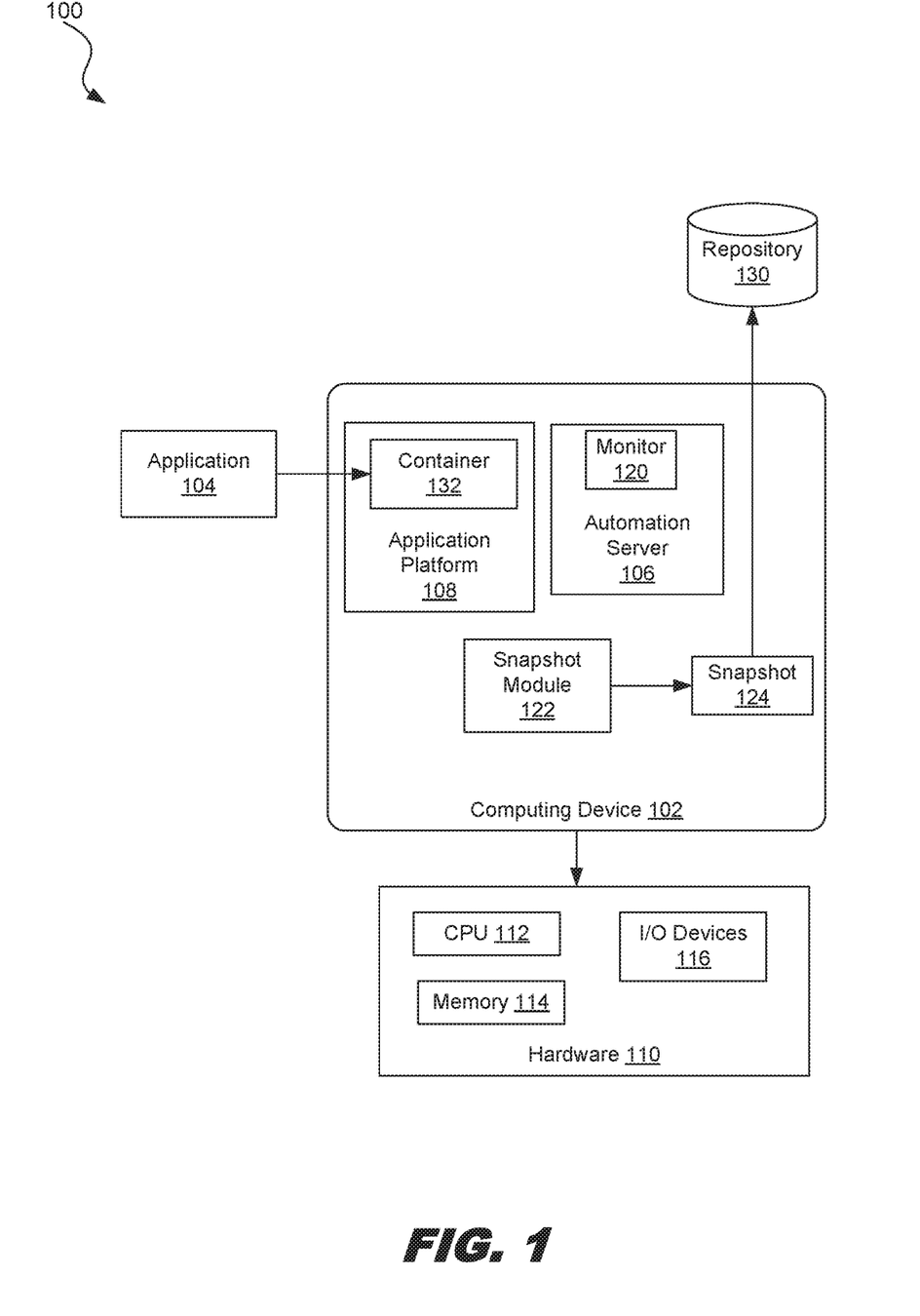
FIG. 1 is a diagram illustrating an example system for reproducing a test case in relation to a continuous integration environment.

FIG. 1 is a diagram illustrating an example system 100 for reproducing a test case in relation to a continuous integration environment. System 100 may be used for generating one or more snapshots in response to detecting a test failure and generating the snapshot, while the test is running in the continuous integration environment. System 100 includes a computer system 102 and hardware 110. In some examples, computer system 102 is coupled over a network (not shown). The network may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and Hypertext Transfer Protocol (HTTP), and various combinations of the foregoing.

Computer system 102 may be coupled to hardware 110 such as central processor unit (CPU) 112 for executing software (e.g., machine-readable instructions) and using or updating data stored in memory 114. Hardware 110 may include more than one CPU 112. A "CPU" may also be referred to as a "processor" or "physical processor" herein. A CPU shall refer to a device capable of executing instructions encoding arithmetic, logical, or I/O operations. In an example, a CPU may follow the Von Neumann architectural model and may include an arithmetic logic unit (ALU), a control unit, and a plurality of registers. In a further aspect, a CPU may be a single-core CPU that is typically capable of executing one instruction at a time (or processing a single pipeline of instructions), or a multi-core CPU that may simultaneously execute multiple instructions. In another aspect, a CPU may be implemented as a single-integrated circuit, two or more integrated circuits, or may be a component of a multi-chip module (e.g., in which individual microprocessor dies are included in a single integrated circuit package and hence share a single socket).

Memory 114 may be one or more of many different types of memory. "Memory" herein shall refer to volatile or non-volatile memory, such as random access memory (RAM), read-only memory (ROM), electrically erasable ROM (EEPROM), or any other memory capable of storing data. Some types of memory, such as solid state drives typically have relatively larger storage volume but relatively slower performance. Other types of memory, such as those used for RAM, are optimized for speed and may be referred to as "working memory" or "main memory." The various types of memory may store information in the form of software and data. The software may include an operating system and various other software applications. Additionally, hardware 110 may include other I/O devices 116.

Computer system 102 includes a container 132, and an application 104 may execute in the container. In an example, application 104 is executable on CPU 112 and is not downloaded onto computer system 102. A user may desire to build, test, and/or deploy application 104 in a continuous integration environment. Continuous integration is a development practice in which developers may integrate code into a shared code repository several times a day. A developer may also be referred to as a user in the present disclosure. Each check-in is then verified by an automated build, allowing teams to detect problems early. A team of application developers may work together to deploy application 104 by tracking its progress in the code repository, with each additional commit issuing a build of the application.

A developer may develop on one or more applications and services, and then integrate them into a continuous integration and deployment workflow. The developer may write software code locally and share her development stack via the platform with her colleagues. During an application lifecycle build phase, the development of the application revolves around many steps, including compiling of source code, resource generation, and packaging of the solution. When ready, developers may push their software code and the stack they are developing onto a test environment and execute tests on the code. From the testing environment, the developers may then push the images into production and deploy code. Automation may continually integrate any checked-in changes, thus rebuilding the project automatically.

Computer system 102 includes an automation server 106 and an application platform 108 for developing, shipping, and/or running applications 104. Automation server 106 automates tasks associated with building, testing, and/or deploying software. Automation server 106 executes a defined list of steps and may perform continuous integration and build automation. In an example, automation server 106 is a JENKINS® server. In this example, automation server 106 may compile JAVA® source code and build a JAVA ARCHIVE® (JAR) from the resulting classes. Trademarks are the property of their respective owners. A trigger for automation server 106 to execute the defined list of steps may be time-based (e.g., every 15 minutes) or event-based (e.g., after a new commit in a repository).

Automation server 106 may perform a build, execute a shell script, archive a build result, and/or run software tests associated with application 104. Automation server 106 includes a monitor 120 that monitors and analyzes debug information about application 104. Monitor 120 may detect a test failure in a continuous integration environment. The continuous integration environment may include a plurality of stages for running a test on application 104. In an example, automation server 106 processes a file (e.g., JENKINS file) that provides a representation of the continuous integration environment by specifying a plurality of stages for running a test on application 104. Monitor 120 monitors the execution of the steps and may freeze the process, if one of the steps fails. Monitor 120 may also send a notification in case of a test success or failure. In an example, monitor 120 detects a test failure by detecting an exit code having a first value in accordance with running the test.

Application platform 108 enables separation of applications from the infrastructure so that software may be delivered quickly. For example, a user may manage application platform 108 similarly to how the user manages applications. In an example, application platform 108 is a containers platform. Application platform 108 provides the user with the ability to package and run an application in a loosely isolated environment called a container 132. The isolation and security may allow the user to run many containers simultaneously on a given host. Containers may run directly within the host machine's kernel, without the extra load of a hypervisor. Application platform 108 may streamline the development lifecycle by allowing the user to work in standardized environments using local containers that provide applications and services. A container may be used for continuous integration and continuous delivery (CI/CD) workflows.

Computer system 102 also includes a snapshot module 122 and is coupled to a repository 130. In response to detecting the failure, snapshot module 122 generates a snapshot 124 while the test is running. Snapshot 124 specifies a stage of the plurality of stages and a state of the application at which the failure occurred. Snapshot module 122 may communicate with application platform 108 and run namespaces inside container 132. Snapshot module 122 may be incorporated within or separate from application platform 108. In an example, snapshot module 122 generates a snapshot of the state of the running application into a collection of files and restores from these files the application from the last point the snapshot was generated.

In an example, the continuous integration environment is encapsulated inside a namespace that may run inside container 132. The namespace may include processes, files, filesystems, and/or packages that determine how the system behaves. In an example, snapshot module 122 generates snapshot 124 by transforming the namespace into a file. In some examples, transforming the namespace into the file includes serializing the state of the application into the file, where the state provides an indication of the stage at which the failure occurred along with the state of the processes. The state of the application includes one or more processes, each process having one or more variables and associated data. To generate the snapshot, snapshot module 122 may freeze the one or more processes and generate snapshot 124 specifying a stage of the plurality of stages and a state of the application at which the failure occurred.

Snapshot module 122 uploads snapshot 124 to repository 130, while the test is running. For example, snapshot module 122 freezes at least apart of application 104, generates snapshot 124, and stores the snapshot to persistent storage as a collection of files. Repository 130 stores snapshots and images. Snapshot module 122 restores the snapshot to a computing device, which may be computing device 102 or another computing device. In an example, snapshot module 122 receives a request to restore the snapshot and in response, deploys a container and runs the container including the namespace. In this example, a user may download the snapshot from the repository and run it from the stage at which the test failure was detected, without any further coding or setup to obtain that state. The snapshot may be deployed inside the container and start off at the stage at which the test failure was detected, with the associated state of the application at which the failure occurred. Accordingly, the user is able to create the same space (e.g., namespace) with the same state detected at test failure on computing device 102 or another computing device. In an example, snapshot module 122 is CRIU® (Checkpoint/Restore in Userspace) and is installed on computing device 102.

Figure 2:
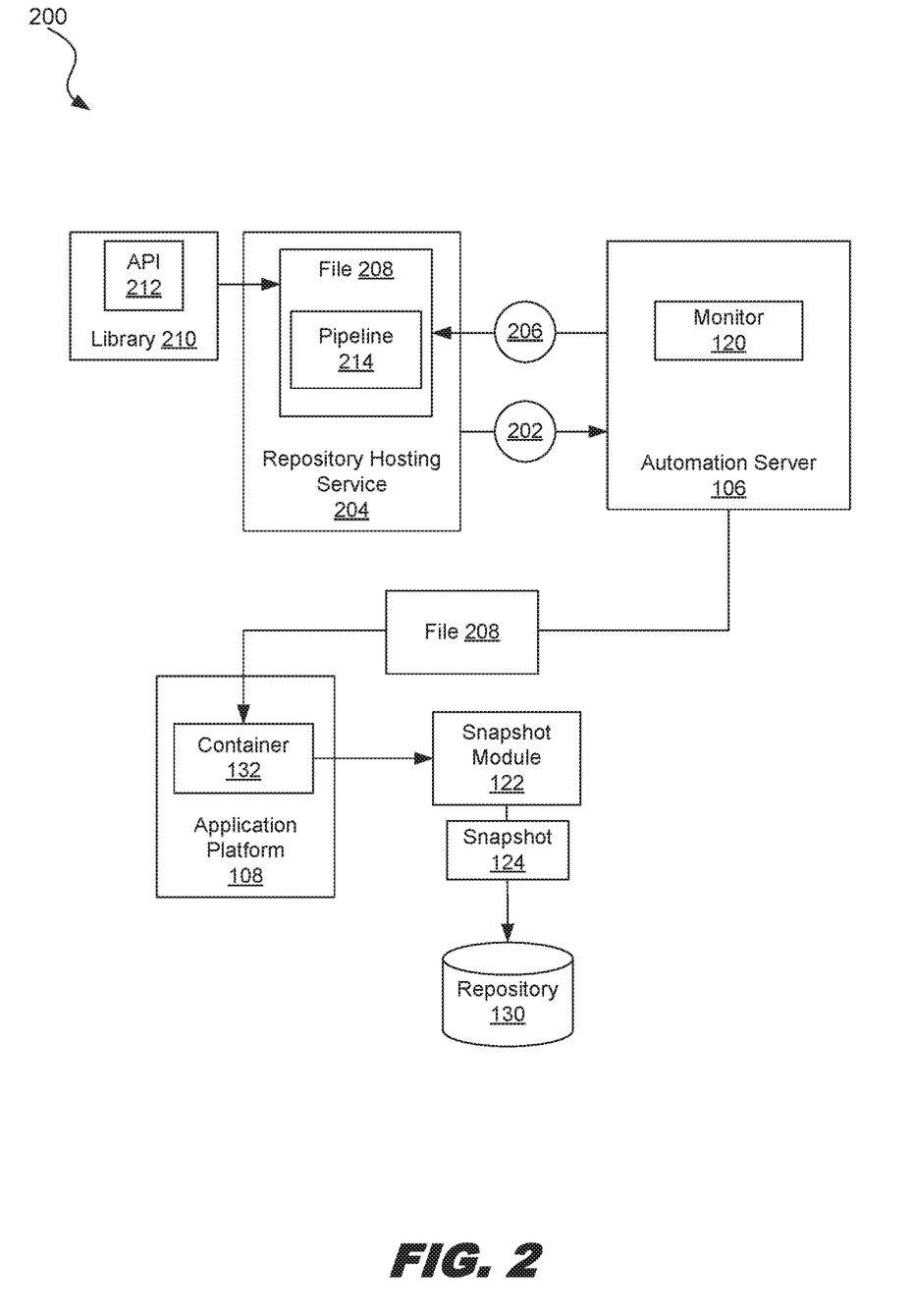
FIG. 2 is an example process flow for reproducing a test case in relation to a continuous integration environment.

FIG. 2 is an example process flow 200 for reproducing a test case in relation to a continuous integration environment. At action 202, a repository hosting service 204 provides an indication to automation server 106 to run tests on changes pushed to it. In an example, repository hosting service 204 is GITHUB®, automation server 106 is JENKINS®, and a user pushes code of application 104 to a repository (e.g., repository hosting service 204) managed by the repository hosting service. In this example, JENKINS® may be triggered by GITHUB® to run tests on application 104 in response to code being pushed to the repository.

At action 206, automation server 106 reads a file 208 stored at repository hosting service 204 to determine where to run the steps, which steps to enable snapshot-mechanism, where to store the snapshot, etc. File 208 may be a text file that contains the definition of a pipeline. A user may specify the pipeline, which may be the test run on application code. In an example, file 208 is a JENKINS® file that specifies a pipeline including two stages. A first stage specifies the containers that should be running (e.g., MYSQL® container and abstract programming interface (API) server container), and a second stage specifies a command to run a particular test, provides the test framework (e.g., PYTEST®), and the storage in which to store the snapshots.

File 208 may include a command to import a library 210 into the file representing the continuous integration. The library may include an API 212 that may be invoked to provide services to a user, such as generating a snapshot or providing notification of a test failure. File 208 may represent a continuous integration environment including a pipeline 214, which includes steps within stages. The pipeline includes a plurality of stages for running a test on an application. File 208 may include one or more pipelines.

API 212 may provide various API calls that are invocable by a user to utilize the services offered by the API. An API call provides one or more services and may also include one or more parameters. For example, a user may invoke an API call offered by API 212 to specify that a test be run on pipeline 214 or a particular stage of the pipeline. For example, the API call may receive as a parameter a user input specifying a pipeline and in response, may run the test on at least a portion of the specified pipeline. In another example, an API call offered by API 212 communicates with snapshot module 122 and generates snapshot 124. In this example, invocation of the API call may be a request from the user to generate the snapshot. In response to receiving the request, API 212 may generate the snapshot.

Figure 3:
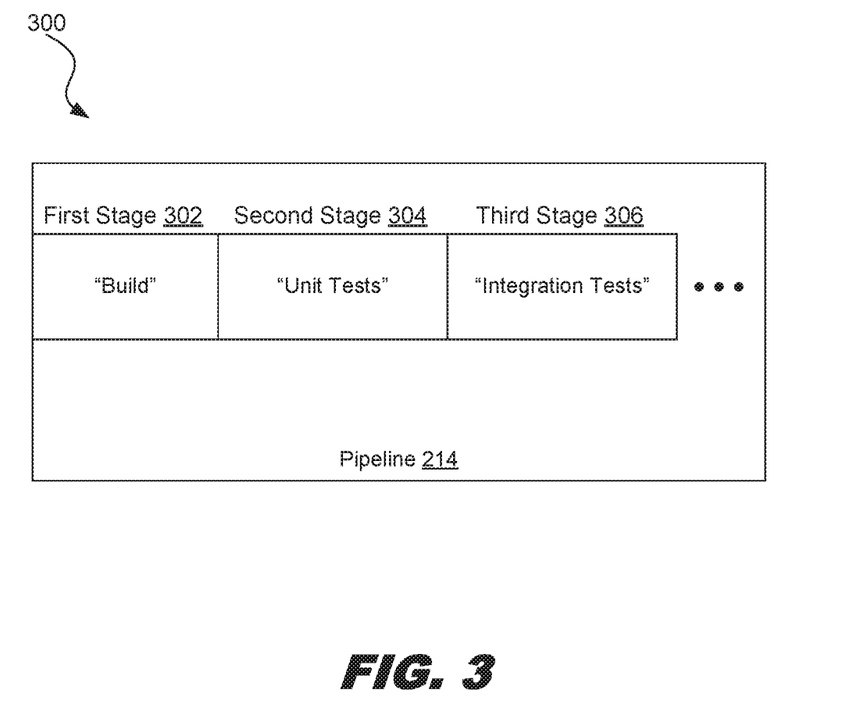
FIG. 3 is an example of a pipeline specified in a file including a plurality of stages.

FIG. 3 is an example of a pipeline 300 specified in file 208 including a plurality of stages. Pipeline 300 may correspond to file 214. The plurality of stages includes a first stage 302 "Build," a second stage 304 "Unit Tests," and a third stage 306 "Integration Tests." The plurality of stages included in pipeline 214 may include more or fewer than the stages provided in FIG. 3. The testing of software code of application 104 may progress through each of these stages in the continuous integration environment.

Figure 4:
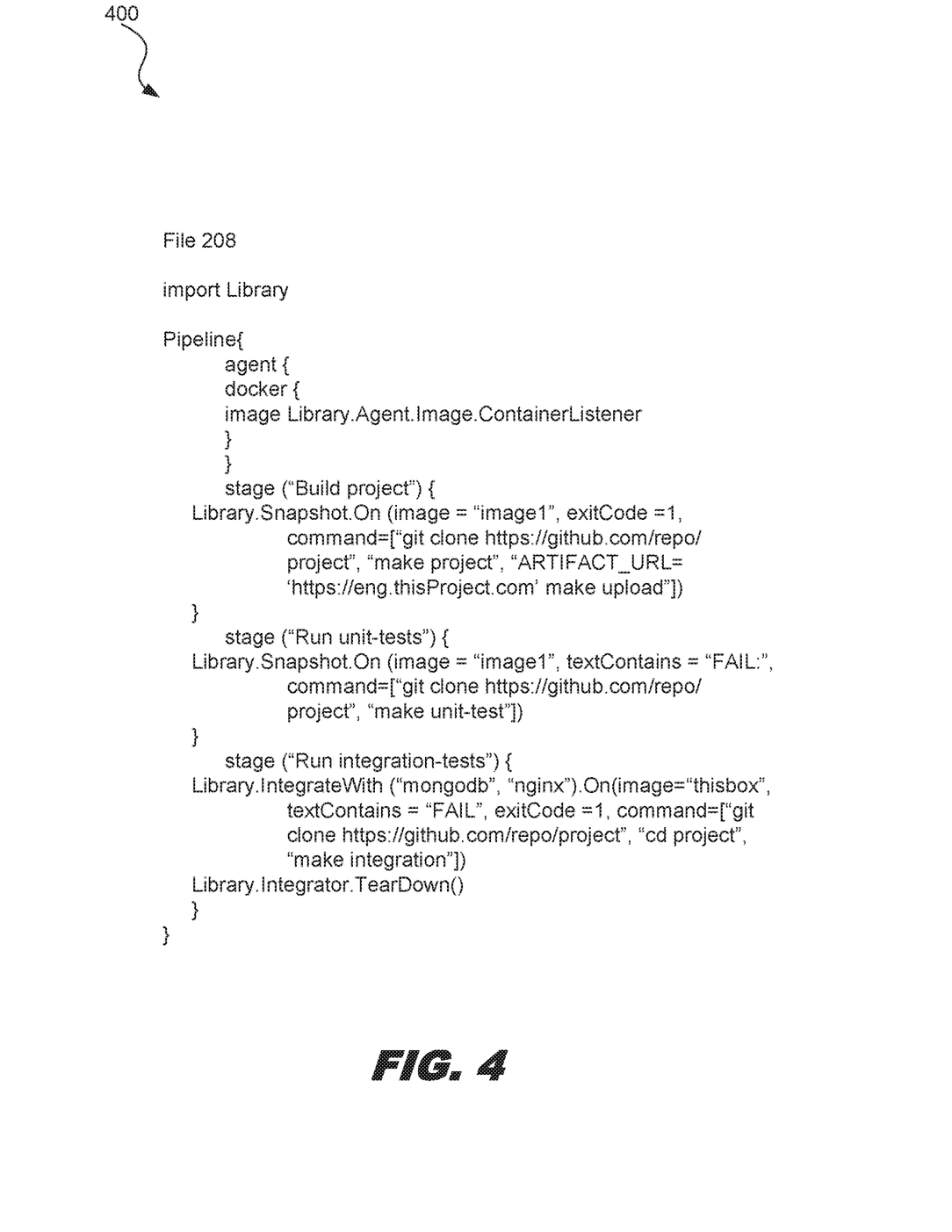
FIG. 4 is an example of file including three stages.

FIG. 4 is an example of a file 400 including first stage 302 "Build," second stage 304 "Unit Tests," and third stage 306 "Integration Tests." File 400 may correspond to file 208. Automation server 106 may execute file 208 and detect that tests with a snapshot option are being run. A snapshot option is an option to generate a snapshot of a state of the application and/or test run. Automation server 106 may run an agent that reads input/output (I/O) streams (e.g., stdout or stderr) from the container running the test on application platform 108.

As shown in FIG. 4, first stage 302 "Build" may be represented by "stage ('Build project')" and may specify a build of the project. First stage 302 may further specify an image including or referencing compilers and build tools for completion of the first stage. To build the project, automation server 106 may use the image "image1" specified in file 208 in the first stage. First stage 302 "Build" may include a command parameter that provides all the commands for implementing the build of the project and may further include an exitCode parameter having a particular value "1". If a command exits with an exit code equal to the particular value, monitor 120 may determine that a test failure has occurred. In response to monitor 120 detecting the failure, snapshot module 122 may execute a snapshot procedure that generates snapshot 124 while the test is running. The snapshot may specify first stage 302 "Build" as being the stage at which the failure occurred and further specify a state of the application at which the failure occurred. In an example, snapshot module 122 starts a snapshot procedure by sending an API request to application program 108 specifying the container(s) and the directory that will be placed in the storage.

Additionally, second stage 304 may be represented by "stage ('Run unit-tests')" and may specify that unit tests should be run on the project. Second stage 304 may further specify the image including or referencing compilers and build tools for completion of the second stage. Second stage 304 may include a command parameter that provides all the commands for implementing the testing of the project and may further include a textContains parameter having a particular value "FAIL". If during the execution of the command in the second stage, a "FAIL:" is present in the output, monitor 120 may determine that a test failure has occurred. In response to monitor 120 detecting the failure, snapshot module 122 may execute a snapshot procedure that generates a snapshot while the test is running. The snapshot may specify second stage 304 "Unit Tests" as being the stage at which the failure occurred and further specify a state of the application at which the failure occurred.

Moreover, third stage 306 may be represented by "stage ('Run integration-tests')" and may specify that integration tests should be run on the project. Third stage 306 may specify that the integration test should have two components before running the test: monogodb aand nginx. Monitor 120 may detect whether a failure occurs during the third stage. In response to monitor 120 detecting the failure, snapshot module 122 may execute a snapshot procedure that generates a snapshot while the test is running. The snapshot may specify third stage 306 "Integration Tests" as being the stage at which the failure occurred and further specify a state of the application at which the failure occurred. After the test is finished executing, the container may be removed, unless it is used in a next step. Additionally, after the test is finished executing, automation server 106 may send a notification with one or more commands to execute, where execution of the one or more commands causes restoration of the state and the debugging information and additional information (e.g., a location of where the snapshots are stored and the tests that failed). When the user no longer desires to view this information or is done with the debugging, the user may remove the files (e.g., by selecting a "Delete" button (not shown) in a web user interface provided by automation server 106).

The example file illustrated in FIG. 4 is not limiting and another file may include additional, fewer, or different commands than that shown in this figure. In another example, the file may include three commands, but only specifies that a snapshot be generated if the second command fails. In this example, if the first or third command fails, the snapshot is not generated. This may be useful if it is desirable to discard failures of some commands, but not others.

Referring back to FIG. 2, automation server 106 may request that the plurality of stages specified in file 208 be executed on application platform 108. In an example, application platform 108 is a DOCKER® host that can be downloaded from a repository specified in "Library.Agent.Image.ContainerListener" (see FIG. 4). Automation server 106 may delegate application platform 108 to run container 132 from snapshot 124. The image and the container configurations allow the container to execute code and to communicate with application platform 108 for generating snapshots. If a test failure in the continuous integration environment is detected during execution of a step N, the container running that step or monitor 120 may send a notification to snapshot module 122 that causes snapshot module 122 to generate a snapshot while the test is running, where the snapshot specifies a stage of the plurality of stages and a state of the application at which the failure occurred. While the test is running, snapshot module 122 may upload the snapshot to a repository that is specified in file 208. At a later point in time, snapshot module may restore the snapshot to a computing device.

Figure 5:
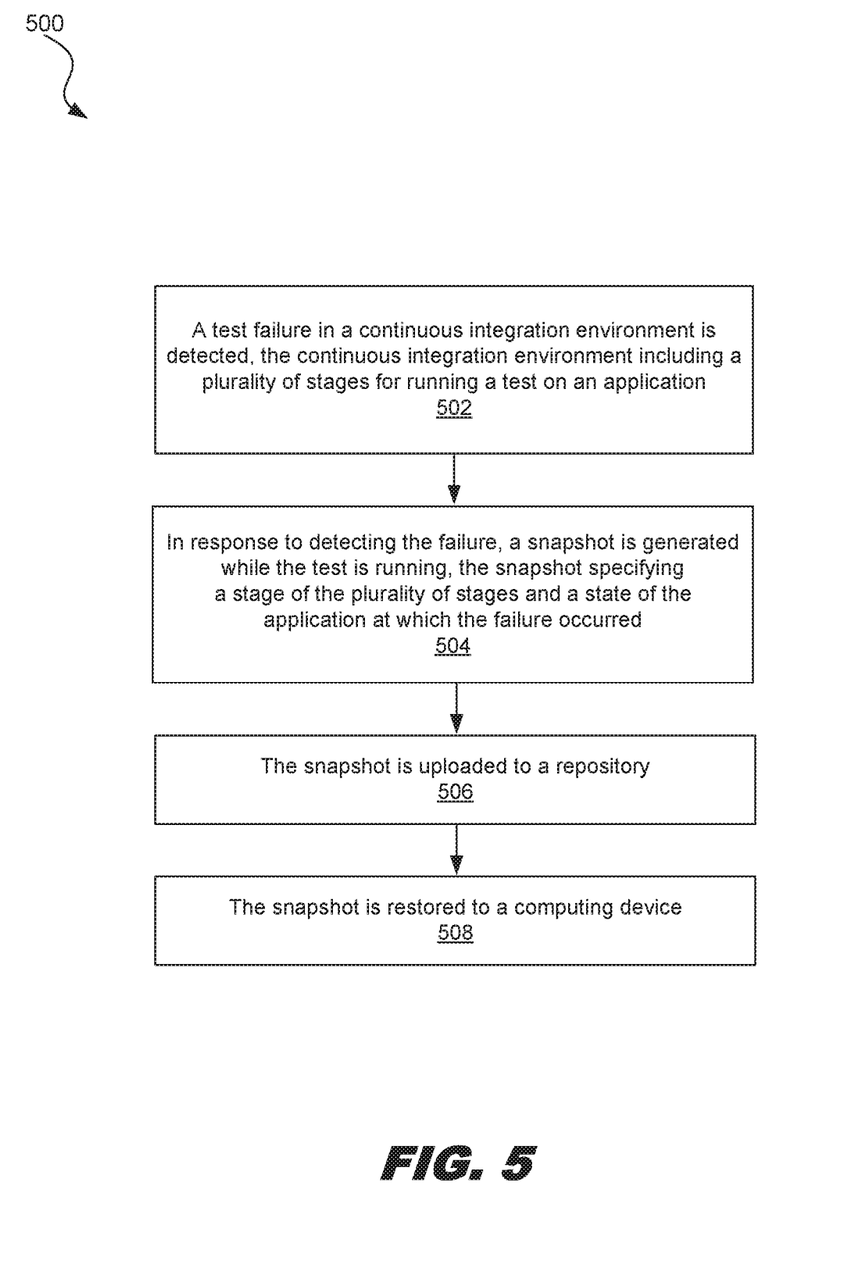
FIG. 5 is an example method flow for reproducing a test case in relation to a continuous integration environment.

FIG. 5 is an example method flow 500 for reproducing a test case in relation to a continuous integration environment. Method 500 is not meant to be limiting and may be used in other applications. Method 500 may be performed by processing logic that may include hardware (e.g., circuitry, dedicated logic, programmable logic and microcode), software (such as instructions run on a computer system, specialized hardware, dedicated machine, or processing device), firmware, or a combination thereof. In some examples, method 500 is performed by system 100 illustrated in FIG. 1. For example, blocks of method 500 may be performed on computer system 102, which may be a client or server computer. In some examples, the order of the actions described below may also be performed according to alternative orderings. In yet other examples, additional actions may be added and actions that are described may be removed.

At action 502, a test failure in a continuous integration environment is detected, the continuous integration environment including a plurality of stages for running a test on an application. At action 504, in response to detecting the failure, a snapshot is generated while the test is running, the snapshot specifying a stage of the plurality of stages and a state of the application at which the failure occurred. At action 506, the snapshot is uploaded to a repository. At action 508, the snapshot is restored to a computing device. The restored snapshot specifies the stage of the plurality of stages and the state of the application at which the failure occurred.

Figure 6:
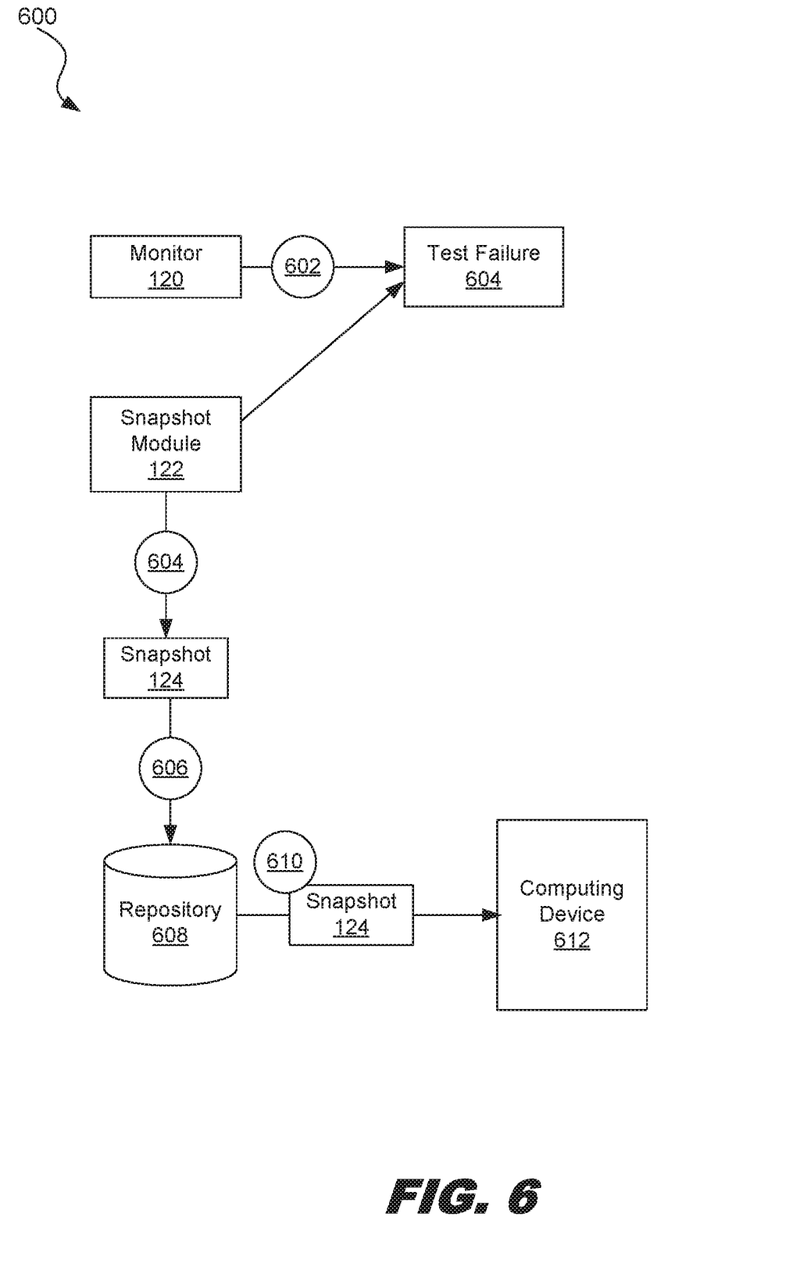
FIG. 6 is an example block diagram for reproducing a test case in relation to a continuous integration environment.

FIG. 6 is an example block diagram 600 for reproducing a test case in relation to a continuous integration environment. At action 602, monitor 120 detects a test failure 604 in a continuous integration environment, the continuous integration environment including a plurality of stages for running a test on an application. At action 604, in response to monitor 120's detection of the test failure, snapshot module 122 generates snapshot 124 while the test is running.

Snapshot 124 specifies a stage of the plurality of stages and a state of the application at which the failure occurred. At action 606, snapshot module 122 uploads the snapshot to a repository 608. Snapshot module 122 may receive a request from a user to restore the snapshot. At action 610, snapshot module 122 restores the snapshot to a computing device 612.

In an example, application platform 108 runs one or more containers, and the continuous integration environment is represented by a file (e.g., file 208) that is executed inside a container (e.g., container 132) and includes the plurality of stages. The snapshot module 122 may receive a first request from the user to restore snapshot 124. In response to the first request, snapshot module 122 sends a second request to application platform 108 to add a second container or sends the second request to another application platform executing on a computing device different from computing device 102. In response to the second request, the application platform adds the second container. Snapshot module 122 retrieves snapshot 124 from the repository (e.g., repository 130) and restores the snapshot to a computing device (e.g., computing device 102). In an example, snapshot module 122 deploys the snapshot inside the second container.

In various implementations, computing device 102 may be a client or server computing device including one or more CPUs 112. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

The computing device 102 may include a bus or other communication mechanism for communicating information data, signals, and information between various components of computer system. The components may include an input/output (I/O) component that processes a user action, such as selecting keys from a keypad/keyboard, selecting one or more buttons or links, etc., and sends a corresponding signal to the bus. For example, a user may use the I/O component to invoke API 212 to run a test on application 104. In another example, the user may use the I/O component to invoke API 212 to generate a snapshot. The I/O component may also include an output component such as a display, and an input control such as a cursor control (such as a keyboard, keypad, mouse, etc.). For example, a user may use the I/O component to request that the snapshot be restored to computing device 102 or another computing device. An audio I/O component may also be included to allow a user to use voice for inputting information by converting audio signals into information signals. Audio I/O component may allow the user to hear audio.

A transceiver or network interface may transmit and receive signals between the client or server computing device and other devices via a communications link to a network. In an example, the transmission is wireless, although other transmission mediums and methods may also be suitable. CPU 112, which may be a micro-controller, digital signal processor (DSP), or other processing component, processes these various signals, such as for display on the client device or transmission to other devices via the communications link. CPU 112 may also control transmission of information, such as cookies or IP addresses, to other devices.

Components of the client or server computing device may also include a system memory component (e.g., RAM), a static storage component (e.g., ROM), and/or a disk drive. Computer system 102 performs specific operations by CPU 112 and other components by executing one or more sequences of instructions contained in the system memory component (e.g., memory 114). Logic may be encoded in a computer readable medium, which may refer to any medium that participates in providing instructions to CPU 112 for execution. Such a medium may take many forms, including but not limited to, non-volatile media, volatile media, and transmission media. In various implementations, non-volatile media includes optical, or magnetic disks, or solid-state drives, volatile media includes dynamic memory, such as the system memory component, and transmission media includes coaxial cables, copper wire, and fiber optics, including wires that include the bus. In an example, the logic is encoded in a non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In some examples, execution of instruction sequences (e.g., method 500) to practice the present disclosure may be performed by the client or server computing device. In various other examples of the present disclosure, a plurality of host machines coupled by the communications link to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various blocks, actions, or steps described herein may be changed, combined into composite blocks, actions, or steps, and/or separated into sub-blocks, sub-actions, or sub-steps to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of reproducing a test case in a continuous integration environment, comprising:
monitoring a file executing in a first container, wherein the file stores a representation of a continuous integration environment including a plurality of stages for running a test on an application, and wherein the continuous integration environment is encapsulated inside a namespace that runs inside the first container;
detecting, based on monitoring the file executing in the first container, a test failure occurring at a stage of the plurality of stages;
in response to detecting the test failure, generating a snapshot while the test is running on the application, wherein the snapshot specifies the stage of the plurality of stages and a state of the application at which the test failure occurred; and
restoring the snapshot by deploying the snapshot inside a second container including the namespace, wherein the restored snapshot specifies the stage of the plurality of stages and the state of the application at which the test failure occurred.

2. The method of claim 1, further comprising:
uploading the snapshot to a first repository while the test is running on the application, wherein restoring the snapshot includes downloading the snapshot from the first repository.

3. The method of claim 2, wherein the file specifies the first repository for storing the snapshot.

4. The method of claim 1, further comprising:
detecting an exit code having a first value in accordance with monitoring the file executing in the first container, wherein detecting the test failure includes detecting the exit code having the first value.

5. The method of claim 4, further comprising:
reading input/output (I/O) streams from the first container running the test on the application, wherein detecting the exit code includes reading an I/O stream including the first value.

6. The method of claim 1, wherein the file is a text file that contains a definition of a pipeline having the plurality of stages.

7. The method of claim 1, wherein the state of the application at which the test failure occurred includes one or more processes, and wherein each process of the one or more processes includes one or more variables and associated data.

8. The method of claim 7, wherein generating the snapshot includes freezing the one or more processes associated with the state of the application at which the test failure occurred.

9. The method of claim 1, wherein restoring the snapshot includes running the test on the application starting from the stage of the plurality of stages and the state of the application at which the test failure was detected.

10. The method of claim 2, further comprising:
detecting code being pushed into a second repository; and
in response to detecting the code being pushed into the second repository, executing the file inside the first container.

11. The method of claim 1, further comprising:
receiving a first request to restore the snapshot; and
in response to receiving the first request to restore the snapshot, sending a second request to an application platform to add the second container.

12. A system for reproducing a test case in a continuous integration environment, comprising:
one or more processors;
a memory;
a monitor that monitors a file executing in a first container and that detects, based on monitoring the file executing in the first container, a test failure occurring at a stage of a plurality of stages, wherein the file stores a representation of a continuous integration environment including the plurality of stages for running a test on an application, and wherein the continuous integration environment is encapsulated inside a namespace that runs inside the first container; and
a snapshot module that, in response to the monitor detecting the test failure, generates a snapshot while the test is running on the application, wherein the snapshot specifies the stage of the plurality of stages and a state of the application at which the test failure occurred, wherein the snapshot module restores the snapshot by deploying the snapshot inside a second container including the namespace, and wherein the restored snapshot specifies the stage of the plurality of stages and the state of the application at which the test failure occurred.

13. The system of claim 12, further comprising:
a first computing device including the monitor, the snapshot module, and an application platform, wherein the application platform runs one or more containers, wherein the snapshot module sends a request to the application platform to deploy the second container, and wherein in response to the request to deploy the second container, the application platform deploys the second container.

14. The system of claim 12, further comprising:
a first computing device including the monitor and the snapshot module; and
a second computing device including an application platform that runs one or more containers, wherein the snapshot module sends a request to the application platform to deploy the second container, and wherein in response to the request to deploy the second container, the application platform deploys the second container.

15. The system of claim 12, wherein the snapshot module uploads the snapshot to a first repository while the test is running on the application.

16. The system of claim 15, wherein the state of the application at which the test failure occurred includes one or more processes, wherein each process of the one or more processes includes one or more variables and associated data, and wherein the snapshot module generates the snapshot by freezing the one or more processes associated with the state of the application at which the test failure occurred.

17. The system of claim 16, wherein the snapshot module restores the snapshot by downloading the snapshot from the first repository.

18. The system of claim 12, wherein the monitor detects the test failure in response to detecting an exit code having a first value.

19. The system of claim 18, wherein the monitor runs an agent that reads input/output (I/O) streams from the first container running the test on the application, and wherein the monitor detects an I/O stream including the first value.

20. A non-transitory computer readable medium storing a plurality of computer readable instructions that when executed by one or more processors is adapted to cause the one or more processors to perform a method comprising;
- monitoring a file executing in a first container, wherein the file stores a representation of a continuous integration environment including a plurality of stages for running a test on an application, and wherein the continuous integration environment is encapsulated inside a namespace that runs inside the first container;
- detecting, based on monitoring the file executing in the first container, a test failure occurring at a stage of the plurality of stages;
- in response to detecting the test failure, generating a snapshot while the test is running on the application, wherein the snapshot specifies the stage of the plurality of stages and a state of the application at which the test failure occurred; and
- restoring the snapshot by deploying the snapshot inside a second container including the namespace, wherein the restored snapshot specifies the stage of the plurality of stages and the state of the application at which the test failure occurred.

* * * * *